United States Patent [19]

Otto

[11] 3,729,789

[45] May 1, 1973

[54] METHOD OF REMOVING A BEARING SEAL ASSEMBLY

[75] Inventor: Dennis L. Otto, Malvern, Ohio
[73] Assignee: The Timken Company, Canton, Ohio
[22] Filed: Apr. 19, 1971
[21] Appl. No.: 135,168

[52] U.S. Cl. ............... 29/148.4 S, 29/200 D, 29/427, 29/DIG. 34
[51] Int. Cl. .................. B23p 19/00, B23p 19/02
[58] Field of Search .................. 29/DIG. 34, 426, 29/427, 200 D, 148.4 S, 200 B

[56] References Cited

UNITED STATES PATENTS 3,533,154  10/1970  Ward..................................29/427

Primary Examiner—Thomas H. Eager
Attorney—Gravely, Lieder & Woodruff

[57] ABSTRACT

A bearing seal assembly includes a seal case having large and small diameter circumferential walls, a radial connecting wall interconnecting the circumferential walls, and a radial end wall at the outermost end of the small circumferential wall. The free end of the large circumferential wall is press fitted into a socket at the end of a bearing cup so that the small diameter wall projects away from the bearing cup and the bearing cone encircled by that cup. The seal assembly further includes an elastomeric seal having a supporting portion which is bonded to the inner surfaces of the small circumferential wall and the radial end wall. The supporting portion is joined to a seal lip through a web, and that lip engages a wear surface as the cone and cup of the bearing rotate relative to one another. The supporting portion is provided with a shoulder which faces the interior of the bearing and provides a seat against which a removal tool bears for detaching the seal assembly from the bearing cup. The supporting portion is bonded to the seal case for substantial distances on each side of the shoulder so that the removal force does not separate the seal case and the seal.

1 Claim, 4 Drawing Figures

Patented May 1, 1973  3,729,789
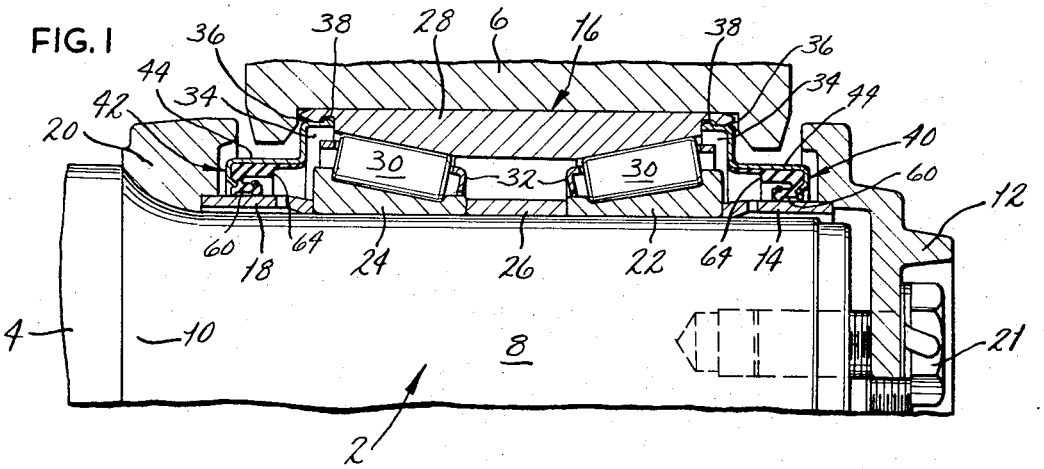
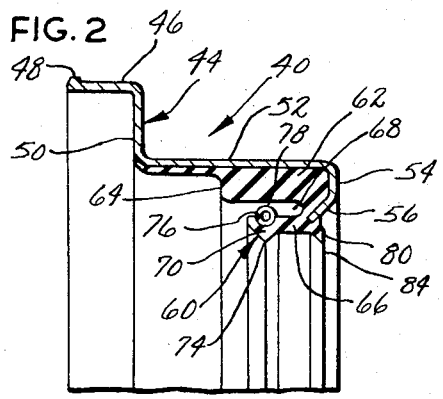
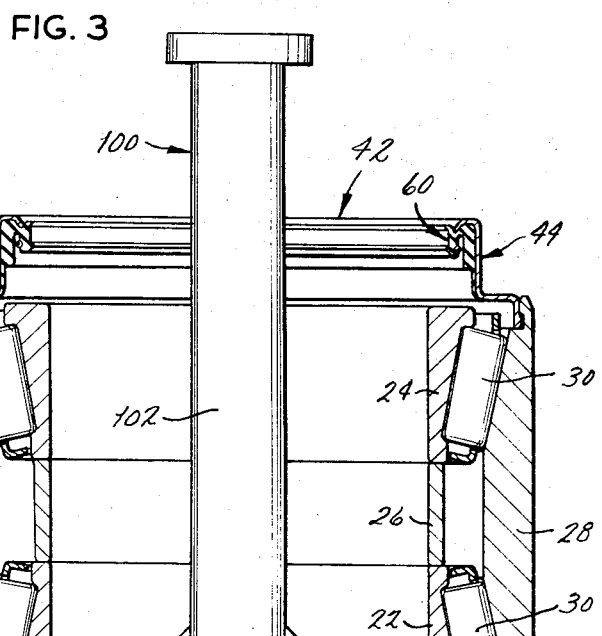
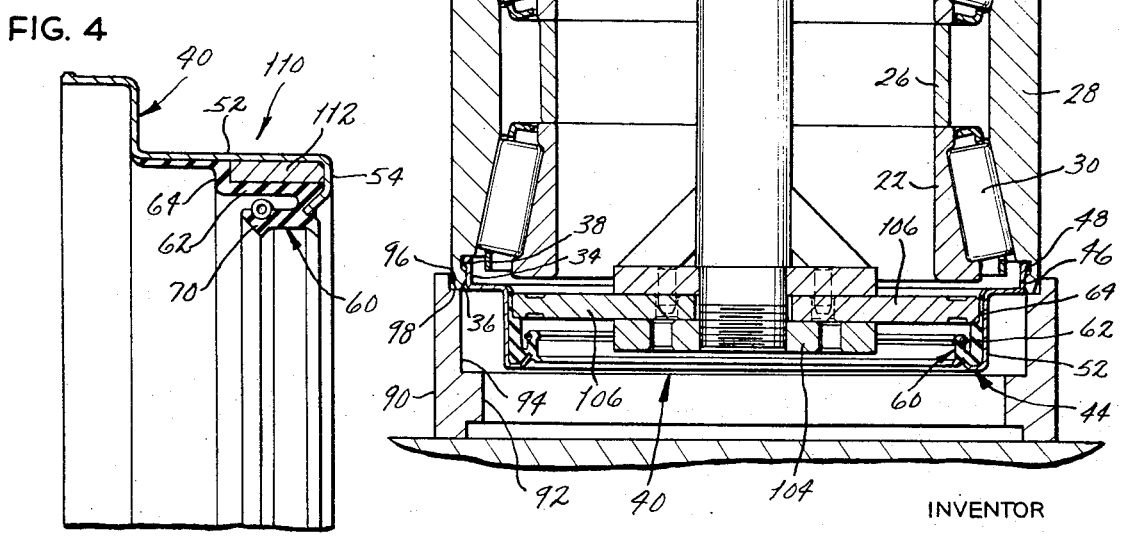
INVENTOR
DENNIS L. OTTO
BY Gravely, Lieder & Woodruff
ATTORNEYS

METHOD OF REMOVING A BEARING SEAL ASSEMBLY

BACKGROUND OF THE INVENTION

This invention relates in general to seal assemblies and more particularly to a method of detaching a seal assembly from a bearing assembly without damaging the seal assembly.

All-purpose tapered roller bearings are normally provided with seal assemblies for retaining lubricants within the vicinity of the bearing rollers and raceways. These seal assemblies usually consist of a seal case and an elastomeric seal which is attached to the case and embraces a shaft or wear ring which rotates relative to the case and the bearing cup. In the typical seal construction, the seal case possesses two circuiferential steps of different diameter. The larger step is press fitted into the bearing cup, while the elastomeric seal is contained wholly within the smaller step. The typical seal also includes a so-called spring retainer or inner case contained within the smaller step and having a separating wall located immediately inwardly from the elastomeric seal. The separating wall provides a surface for locating the removal tool which is used to detach the seal case from the bearing cup. In particular, the removal tool is inserted through the bearing and located against the separating wall, at which time an outwardly directed axial force is applied to that wall. This force, of course, is transferred to the seal case and overcomes the interference fit between the large diameter step and the bearing cup, thus freeing the seal case from the cup. Occasionally, the axial force will deform the separating wall of the inner case before the outer step breaks away from the bearing cup, and when this occurs the nearby elastomeric seal is usually distorted to the extent that it will not properly seat against the wear ring or shaft when the seal case is again installed in the bearing cup. This in turn results in a defective seal.

SUMMARY OF THE INVENTION

One of the principal objects of the present invention is to provide a process for removing a seal assembly from a bearing cup without damaging or permanently distorting the seal lip. Another object is to provide a process for removing a seal assembly having the elastomeric seal bonded to a relatively large area of the seal case. An additional object is to provide a process for removing a seal assembly which dispenses with the inner seal case found in typical seals and therefore does not contain a metal member which will permanently deform when subjected to removal forces. These and other objects and advantages will become apparent hereinafter.

The present invention is embodied in a process for removing a bearing seal assembly having a seal case and an elastomeric seal bonded to the seal case. The seal has a shoulder against which an axial force is applied for removing the seal assembly from a bearing. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur:

FIG. 1 is a fragmentary sectional view of a bearing assembly provided with the seal assemblies constructed in accordance with the embodying the present invention;

FIG. 2 is an enlarged sectional view of the seal assembly illustrated in FIG. 1;

FIG. 3 is a sectional view showing the seal assembly being removed from he bearing; and FIG. 4 is a sectional view of a modified seal assembly.

DETAILED DESCRIPTION

Referring now in detail to the drawings, 2 designates a bearing assembly (FIG. 1) positioned between an axle or a shaft 4 and a containing structure 6 such as an adapter or bearing housing in the side frame of a rail car truck. The bearing assembly 2, of course, permits the shaft 4 to rotate freely relative to the containing structure 6. The shaft 4 is provided with a reduced end 8 which merges into the remainder of the shaft 4 at a shoulder 10, and it is the reduced end 8 which projects into the bearing assembly 2 and containing structure 6.

The bearing assembly 2 from its outer end inwardly includes (FIG. 1) an end cap 12 positioned across the end face of the reduced shaft end 8, an outboard wear ring 14, a tapered roller bearing 16, an inboard wear ring 18, and a backing ring 20. The end cap 12 is secured to the shaft 4 by bolts 21 qhich thread into the reduced shaft end 8, and whén tightened compress the outboard wear ring 14, the bearing 16, the inboard wear ring 18 and the backing ring 20 between the end cap 12 and the shaft shoulder 10.

The bearing 16 includes (FIG. 1) a pair of cones 22 and 24 through which the shaft end 8 extends, and these cones 22 and 24 have outwardly presented raceways and are separated by a spacer 26. The cone 22, the spacer 26, and the cone 24 are clamped firmly together in that order between the outboard wear ring 14 and the inboard wear ring 18, which in turn are clamped between the end cap 12 and the backing ring 20, so that the bearing 16 does not shift axially on the shaft 4. In addition to the cones 22 and 24 and the spacer 26, the bearing 16 also includes a double cup 28 which fits into the containing structure 6 and has a pair of inwardly presented raceways located opposite to the raceways of the two cones 22 and 24. The bearing 16 further includes tapered rollers 30 which are fitted between the cup 28 and the cones 22 and 24 and are engaged with the opposed raceways thereon. The rollers 30, accordingly, are arranged in two rows, and the individual rollers 30 of each row are separated by a cage 32. Beyond the large diameter ends of its raceways, the cup 28 is provided with short outwardly opening sockets 34 which possess a cylindrical configuration. At their outer ends the sockets 34 are provided with chamfers 36, and at their inner ends they are relieved in the formation of inwardly opening grooves 38. The grooves 38 separate the surfaces of the sockets 34 from the raceways of the cup 28.

Fitted into the sockets 34 at the ends of the double cup 28 and fixed firmly with respect to the cup 28 are seal assemblies 40 and 42 (FIG. 1) which project outwardly from the cup 28 and embrace the wear rings 14 and 18, respectively, for preventing lubricants from escaping from the interior of the bearing 16. Aside from the seal assemblies 40 and 42, the foregoing bearing assembly 2 is conventional and therefore will not be described in further detail.

The seal assemblies 40 and 42 are identical in construction, and by reason of this fact, only the seal assembly 40 will be described in detail. The seal assembly 40 includes (FIG. 2) a seal case 44 which is preferably stamped from sheet steel and possesses a stepped configuration. The seal case 44 closes the end of the bearing 16 and includes a large diameter circumferential wall 46 which fits into the socket 34 on the outboard end of the cup 28. The diameter of the wall 46 is slightly greater than the diameter of the socket 34 so that an interference fit exists when the former is inserted into the latter. At its one end the wall 46 is provided with an integral locking bead 48 which projects outwardly therefrom and fits into the groove 38 at the inner end of the socket 34. Thus, the outer diameter of the locking bead 48 is greater than the diameter of the socket 34. At its opposite end the large circumferential wall 46 merges into a radial connecting wall 50 which extends radially inwardly beyond the large diameter end faces of the tapered rollers 30, and the radial connecting wall 50 in turn merges at its small diameter end into a small diameter circumferential wall 52 which projects axially away from the bearing 16 and encircles the outboard wear ring 14, being spaced outwardly therefrom. At its outer end the small circumferential wall 52 merges into a radial end wall 54 having an oblique lip 56 which turns axially inwardly and is disposed between the small circumferential wall 52 and the wear ring 14. The innermost end of the lip 56 is also spaced outwardly from the wear ring 14.

In addition to the seal case 44, the seal assembly 40 also includes an elastomeric seal 60 (FIG. 2) which is molded from a suitable elastomer as a unitary structure and is attached to the small circumferential wall 52 and the radial end wall 54. In particular, the seal 60 includes a supporting portion 62 which is bonded to the entire inwardly presented faces of the small circumferential wall 52 and the radial end wall 54, including the lip 56 of the latter. The supporting portion 62 is quite narrow along that part of the circumferential wall 52 which is adjacent to radial connecting wall 50, and indeed, the innermost end of this narrow segment curves around the inside corner formed by the juncture of the circumferential wall 52 and the connecting wall 50. Intermediate the ends of the small circumferential wall 52 the supporting portion abruptly widens at a shoulder 64 so that between the shoulder 64 and the radial end wall 54 the wupporting portion 62 possesses substantial thickness. The face of the shoulder 64 is presented inwardly toward the bearing 16 and is perpendicular to the axis of rotation for the bearing 16.

Adjacent to the radial end wall 54 the supporting portion 62 turns inwardly and extends along the inwardly presented face of the oblique lip 56, to which it is also bonded. Near the inner end of the lip 56, the supporting portion 62 merges into an integrally formed connecting web 66 which extends generally axially between the thick segment of the supporting portion 62 and the outboard wear ring 14. Indeed, the connecting web 66 and the thick segment of the supporting portion 62 are separated by an annular relief 68 in the seal 60, and the presence of the relief 68 allows the web 66 to flex outwardly toward the encircling thick segment of the supporting portion 62.

At its inner end the connecting web 66 is formed integral with and supports an oil or primary seal lip 70 formed by converging surfaces which intersect at a sealing edge 74 disposed radially inwardly from the connecting web 66. The sealing edge 74 engages the outwardly presented surface of the outboard wear ring 14, and this engagement creates a barrier which appreciably retards the leakage of grease and oil along the wear ring 14. On its back side, the seal lip 70 has a retaining groove 76 of semi-circular cross-sectional shape, and this groove 76 opens into the annular relief 68. Fitted into the groove 76 and retained by the walls thereof is a garter spring 78 which extends circumferentially around the seal lip 70 and urges its sealing edge 74 into snug engagement with the wear ring 14. Finally, it should be noted that the entire seal lip 70 is axially offset from the shoulder 64, and the axial offset is such that the seal lip 70 is disposed axially outwardly from the shoulder 64.

The opposite or outer end of the connecting web 66 merges into a secondary or dust lip 80 which is disposed radially inwardly from the oblique lip 56 and is considerably smaller than the primary lip 70. Like the primary lip 70, the dust lip 80 has converging surfaces which intersect at a sealing edge 84. That edge 84 also engages the wear ring 14 axially outwardly from the edge 74 of the primary lip 70, and its primary purpose is to prevent the entry of dust, grit and other contaminants into the interior of the bearing 16.

When the shaft 4 rotates relative to the containing structure 6, the cones 22 and 24 will rotate relative to the double cup 28 and the rollers 30 will roll along the opposed raceways of the cones 22 and 24 and the cup 28. The wear rings 14 and 18, being clamped against the cones 22 and 24, will likewise rotate with the shaft 4, whereas the seal assemblies 40 and 42 remain fixed to the cup 28. Accordingly, the wear rings 14 and 18 rotate relative to the seal assemblies 40 and 42. The seal assemblies 40 and 42 close the ends of the bearing 16, and as the shaft 4 rotates relative to the containing structure 6 the seal lips 70 and 80 at their sealing edges 74 and 84, respectively, engage and wipe the outwardly presented surfaces of the wear rings 14 and 18. The seal lips 70 prevent the lubricant contained within the bearing 16 from escaping, whereas the lips 80 prevent the entry of dirt, grit and other contaminants into the bearing 16.

The seal case 44 of each seal assembly 40 and 42 is, of course, formed separate from the bearing 16. To install each of the seal assemblies 40 and 42 in the double cup 28, the free end of the large circumferential wall 46 is aligned with the socket 34 in the end of the cup 28. Thereafter, an axial force is applied to outside surface of the radial connecting wall 50, and this force drives the large circumferential wall 46 into the socket 34. As the circumferential wall 46 enters the socket 34, the chamfer 36 cams the locking bead 48 inwardly, and this in turn contracts the free end of the wall 46, but not beyond its elastic limit. The locking bead 48 thereafter slides across the surface of the socket 34, and once the large diameter circumferential wall 46 is fully inserted into the socket 34, the bead 48 will snap outwardly into the inwardly opening groove 38 at the end of the tapered cup raceway. This enables the adjoining portion of the circumferential wall 46 to expand and snugly engage the surface of the socket 34. The disposition of the locking bead 48 in the groove 38 axially positions and retains the seal case 44 in its cup socket 34, while the interference fit between the circumferential wall 46 and the surface of the socket 34 prevents the seal case 44 from rotating relative to the cup 28.

In order to disassemble the bearing 16 it is necessary to remove it from the shaft 4 and containing structure 6. The bearing 16 is easily detached from the shaft 4 by withdrawing the bolts 21 and removing the end cap 12 from the reduced end 8. Once the end cap 12 is removed, the reduced shaft end 8 is withdrawn from the cones 22 and 24 and spacer 26 of the bearing 16 as well as from the wear rings 14 and 18 and backing ring 20. While the bearing 16 is then free of the shaft 4, it is still held together by the seal assemblies 40 and 42 at each of its ends. In other words, the seal assemblies 40 and 42 prevent the cones 22 and 24 from being withdrawn from the double cup 28.

After the bearing 16 is free of shaft 4 and the wear rings 14 and 16 have been removed from the seal assemblies 40 and 42, one end of the double cup 28 is inserted in a bearing support ring 90 (FIG. 3) having three bores 92, 94, and 96 which are progressively larger in size. The smallest bore 92 is sized to loosely receive the small diameter circumferential wall 52; the intermediate bore 94 is sized to loosely receive large circumferential wall 46; while the largest bore 96 is relatively short and loosely receives one end of the cup 28. Indeed, the bores 94 and 96 are separated by a shoulder 98 and the end of the cup 28 rests upon this shoulder 98.

Once the cup 28 is fitted into the support ring 90, a removal tool 100 (FIG. 3) is inserted through the bearing 16 until its lead end is in the vicinity of the seal assembly 40, that is the seal assembly which is disposed partially within the support ring 90. The removal tool 100 has a shank 102 which is somewhat longer than the bearing 16 and at its lead end is provided with a head 104 or nut to which retractable or removable jaws 106 are attached. The jaws 106 when retracted or removed allow the tool 100 to pass through the two cones 22 and 24 and the spacer 26. However, when extended or inserted the jaws 106 project outwardly to the thin segment of the supporting portion 62 forming part of the elastomeric seal 60. Indeed, the jaws 106 may be held in the retracted or removed position until they align with the space between the shoulder 64 for the seal 40 and the end face of the adjacent cone 22. Once they align with this space, the jaws 106 may be extended or inserted until their outer surfaces are located adjacent to the thin segment of the supporting portion 62 for the seal ring 60 and their forward faces are positioned opposite to the shoulder 64. If removable jaws are used nut 104 is installed at this time, holding jaws 106 in position.

Thereupon an axial force is applied to the shank 102, and this force is transmitted to the seal assembly 40 at the shoulder 64 thereon. More specifically, upon the application of the axial force the jaws 106 bear against the radial surface of the shoulder 64, and this force is transmitted to the seal case 44 along the extended bond between the supporting portion 62, on one hand, and the small diameter circumferential wall 52 and radial end wall 54, on the other.

The axial force overcomes the interference fit between the socket 34 and the large circumferential wall 46 and further brings the locking bead 48 against the side of the groove 38, causing that bead 48 to be cammed inwardly. This contracts the end of the large diameter circumferential wall 46 and allows the bead 48 to pass along the surface of the socket 34. Once the bead 48 reaches the end of the socket 34, the entire seal assembly 40 falls free of the cup 28 and drops into the bores 92 and 94 of the support ring 90.

While the thick segment of the elastomeric supporting portion 62 is temporarily deformed to a limited extent at the shoulder 64 upon the application of force to that shoulder, the deformation is not enough to enable the jaws 106 of the removal tool 100 to damage the axially offset seal lip 70. In other words, the lip 70 is offset sufficiently from the shoulder 64 to prevent damage thereto by the jaws 106 of the tool 100. Moreover, the supporting portion 62 retains the full thickness of its shoulder 64 beyond the shoulder 64, so that the removal force is not only transmitted through the bond between the supporting portion 62 and the small circumferential wall 52, but is also transmitted through the thick segment of the supporting portion 62 to the radial end wall 54. Thus, the elastomeric seal 60 remains firmly bonded to the seal case 44, notwithstanding the application of substantial removal force to the seal 60 at the shoulder 64 thereon.

The seal assemblies 40 and 42 contain a minimal number of components and can therefore be easily manufactured.

It is possible to provide a modified seal assembly 110 (FIG. 4) which is very similar to the seal assembly 40. However, the supporting portion 62 of the elastomeric seal 60 for the seal assembly 110, is not bonded to the entire inwardly presented surface of the small circumferential wall 52 and radial end wall 54, but is instead bonded partially to those walls 52 and 54 and also to a steel reinforcing ring 112 which is fitted into the small circumferential wall 52 and against the end wall 54. The seal 60 is molded completely around the reinforcing ring 112 so that the reinforcing ring 112 is in effect captured between the molded supporting portion 62, on one hand, and the small circumferential wall 52 and radial end wall 54, on the other hand.

The reinforcing ring 112 extends axially inwardly beyond the seal lip 70 and provides a rigid backing for the shoulder 64. Consequently, when the removal force is applied to that shoulder 64, deformation of the supporting section 62 is minimal.

This invention is intended to cover all changes and modifications of the example of the invention herein chosen for purposes of the disclosure which do not constitute departures from the spirit and scope of the invention.

What is claimed is:

1. A process for removing a seal assembly from a bearing, the seal assembly including a seal case having a first circumferential wall frictionally engaged with a component of the bearing and a second circumferential wall located axially outwardly from the first circumferential wall and projecting away from the bearing, the seal assembly also including an elastomeric seal having a supporting portion which is bonded to the second circumferential wall and a seal lip connected to the supporting portion, the supporting portion having a shoulder formed thereon and facing the interior of the bearing; said process comprising: inserting a jaw-type removal tool into the bearing; positioning the jaws of the tool so that they are presented to engage the shoulder on the elastomeric supporting portion of the seal; and applying an axially directed force to the tool, whereby the force is transmitted to the seal assembly at the shoulder on the supporting portion.

* * * * *